United States Patent
Kentley-Klay

(10) Patent No.: US 11,181,913 B2
(45) Date of Patent: Nov. 23, 2021

(54) AUTONOMOUS VEHICLE FLEET MODEL TRAINING AND TESTING

(71) Applicant: Zoox, Inc., Foster City, CA (US)

(72) Inventor: Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 191 days.

(21) Appl. No.: 16/666,251

(22) Filed: Oct. 28, 2019

(65) Prior Publication Data

US 2020/0064842 A1 Feb. 27, 2020

Related U.S. Application Data

(63) Continuation of application No. 15/803,603, filed on Nov. 3, 2017, now Pat. No. 10,459,444.

(51) Int. Cl.
*G05D 1/00* (2006.01)
*G05D 1/02* (2020.01)
*G08G 1/123* (2006.01)
*G07C 5/00* (2006.01)

(52) U.S. Cl.
CPC ......... *G05D 1/0088* (2013.01); *G05D 1/0027* (2013.01); *G05D 1/0221* (2013.01); *G07C 5/008* (2013.01); *G08G 1/123* (2013.01); *G05D 2201/0213* (2013.01)

(58) Field of Classification Search
CPC .. G05D 1/0088; G05D 1/0221; G05D 1/0027; G05D 2201/0213; G07C 5/008; G08G 1/123
See application file for complete search history.

(56) References Cited

U.S. PATENT DOCUMENTS

| | | | |
|---|---|---|---|
| 6,609,051 B2 | 8/2003 | Fiechter et al. |
| 8,989,945 B2 | 3/2015 | Callow |
| 2002/0188384 A1 | 12/2002 | Becker et al. |
| 2017/0168500 A1 | 6/2017 | Bradley et al. |
| 2018/0077518 A1 | 3/2018 | Nguyen et al. |

(Continued)

OTHER PUBLICATIONS

Buyya, Ramkumar et al.; Single System Image (SSI); The International Journal of High Performance Computing Applications, vol. 15, No. 2, Summer 2001, pp. 124-135.

(Continued)

*Primary Examiner* — Michael J Zanelli
(74) *Attorney, Agent, or Firm* — Lee & Hayes, P.C.

(57) ABSTRACT

A method and system of using excess computational resources on autonomous vehicles. Such excess computational resources may be available during periods of low demand, or other periods of idleness (e.g., parking). Where portions of computing resources are available amongst a fleet of vehicles, such excess computing resources may be pooled as a single resource. The excess computational resources may be used, for example, to train and/or test machine-learning models. Performance metrics of such models may be determined using hardware and software on the autonomous vehicle, for example sensors. Models having performance metrics outperforming current models may be considered as validated models. Validated models may be transmitted to a remote computing system for dissemination to a fleet of vehicles.

20 Claims, 7 Drawing Sheets

(56) References Cited

U.S. PATENT DOCUMENTS

2018/0348784 A1    12/2018  Zheng et al.
2019/0049987 A1*    2/2019  Djuric .................. G06K 9/6288

OTHER PUBLICATIONS

Office Action for U.S. Appl. No. 15/803,603, dated Mar. 5, 2019, Kentley-Klay, "Autonomous Vehicle Fleet Model Training and Testing ", 6 pages.
Vishnukumar et al., "Machine Learning and Deep Neural Network—Artificial Intelligence Core for Lab and Real-World Test and Validation for ADAS and Autonomous Vehicles", Intelligence Systems Conference, IEEE, Sep. 7-8, 2017, pp. 714-721.

* cited by examiner

AUTONOMOUS VEHICLE FLEET MODEL TRAINING AND TESTING

RELATED APPLICATIONS

This application claims priority to U.S. patent application Ser. No. 15/803,603, filed Nov. 3, 2017, which is incorporated herein by reference

BACKGROUND

Autonomous vehicles that receive limited or no input from a passenger may include computing systems engineered to operate under normative conditions and, to the extent extraneous circumstances the autonomous vehicle may encounter are contemplated, some unusual conditions. However, these systems may not be sufficient (e.g. may not have properly trained models or adequate amount of computing power) to handle contingencies encountered during operation of the autonomous vehicle.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
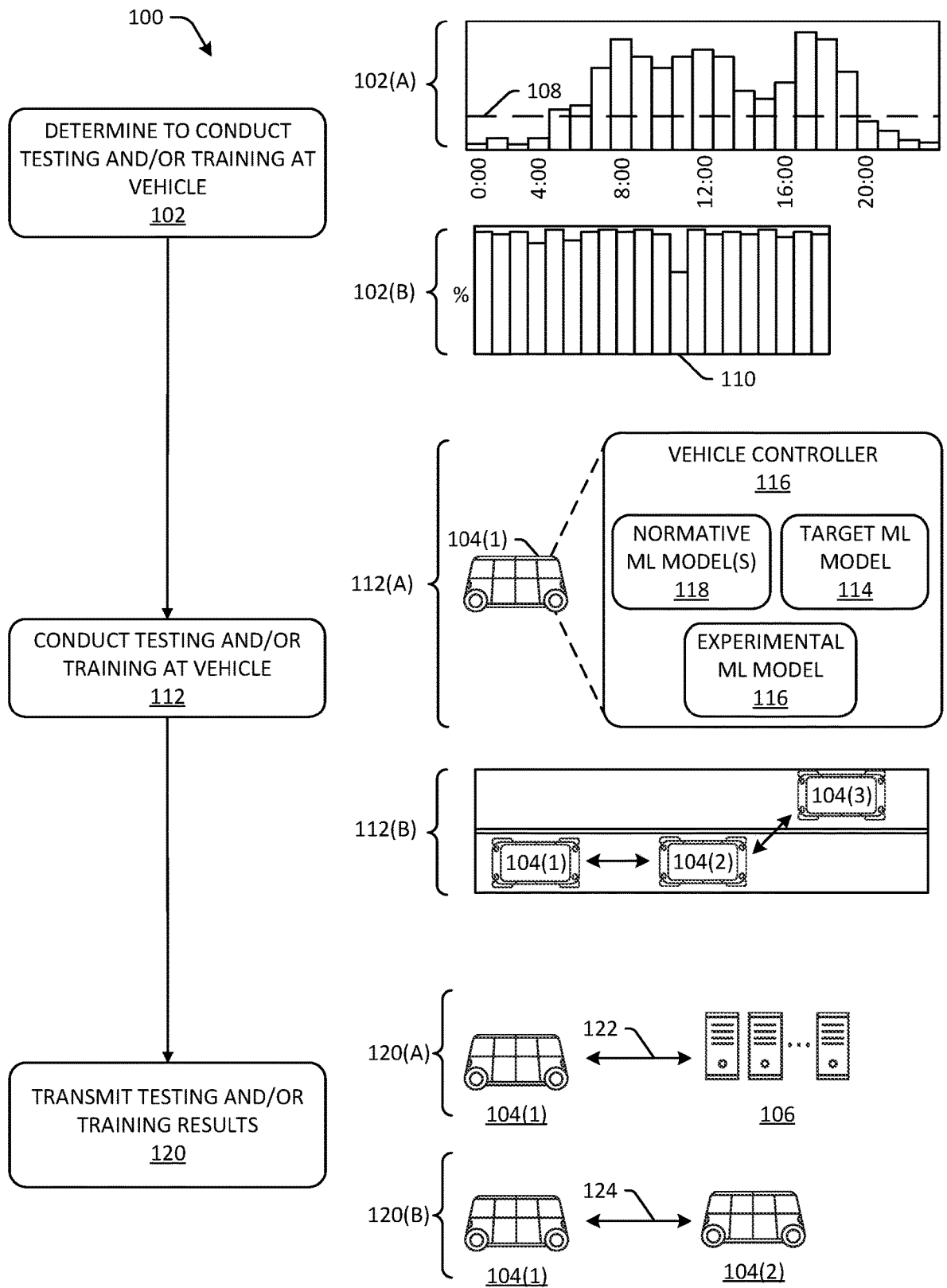
FIG. 1 illustrates a pictorial flow diagram of an example process for training and/or testing machine-learning ("ML") models at a vehicle.

This disclosure is generally directed to techniques (e.g., machines, processes) for using unused computational resources, such as processor clock cycles for processing data, at one or more autonomous vehicles. The autonomous vehicles may be configured to use unused computational resources to train and/or test machine-learning models and/or to pool computational resources to process high-volume computational tasks. For example, autonomous vehicles may include one or more machine-learning (ML) models to operate the vehicle (e.g., models for identifying and/or tracking objects; route-planning; trajectory-planning; evaluating decisions; etc.). An autonomous vehicle may require updates and/or additions to its ML models to handle previously unencountered scenarios or to improve one or more driving parameters (e.g., an ability to correctly predict and/or classify an object, vehicle efficiency, comfort, etc.). For example, an additional and/or revised ML model may be transmitted to the autonomous vehicle to handle sensor noise caused by the position of the sun at a particular intersection and time of day so as to provide higher accuracy in predicting object classifications.

The techniques discussed herein include using unused computational power of an autonomous vehicle to train and/or test (e.g., an ML model). In the interest of prioritizing safety and unhindered operation, rather than merely relying on synthetic simulation and testing of the ML model offline (i.e., running the ML model without using the hardware of a vehicle, live sensor data of a vehicle, and/or without operating a vehicle), the techniques discussed herein include testing and/or training an ML model online at an autonomous vehicle (i.e., using the hardware and/or live sensor data of the autonomous vehicle and/or operating the autonomous vehicle using the ML model). This may include using unused computational power at an autonomous vehicle, using sensor data captured by sensors of the autonomous vehicle, and/or using the ML model in a pipeline to operate the autonomous vehicle.

In some examples, this may include detecting that one or more autonomous vehicles are or are predicted to be available to conduct testing and/or training and diverting the one or more autonomous vehicles from "in-service" operation (e.g., providing ride services, conducting region mapping, etc.) to conduct the testing and/or training. However, in some examples, one or more of the autonomous vehicles may conduct the testing and/or training while remaining in an "in-service" operation state. For example, an autonomous vehicle may be operating in a computationally light scenario that requires less cycles of a processor of the autonomous vehicle to be allocated to nominative operation of the vehicle (e.g., the vehicle is driving down a long, straight roadway with no intersections and low or no traffic, the vehicle is at a stop light, the vehicle is parked).

An autonomous vehicle and/or a remote computing device (e.g., a teleoperations device, a fleet management device, another autonomous vehicle) may detect that the autonomous vehicle is or will be available to conduct testing and/or training. This may include determining a processing bandwidth at one or more processors of a vehicle (e.g., determining a number of threads allocated to the one or more processors, a number of cycles devoted to a thread, a priority of an allocated thread or a thread-to-be-allocated, and/or a remaining number of threads that may be allocated to the one or more processors, etc.), determining a likely processing load for a current route of a vehicle, and/or determining availability of fleet vehicles from historical data (e.g., service demand data). In some examples, upon determining that autonomous vehicle(s) are available to conduct testing and/or training, a remote computing device may transmit a test mission to the autonomous vehicle(s) that includes a time and/or time period, a location, a condition, and/or instructions for at least one maneuver of the autonomous vehicle(s) for operation during testing and/or training.

In some examples, an autonomous vehicle may include a vehicle controller that includes one or more machine-learning models. ML models may include, for example, one or more of an artificial neural network ("ANN"), such as a convolutional neural network ("CNN"); a directed acyclic graph ("DAG") (e.g., where the nodes are organized as a Bayesian network); a support vector machine ("SVM"), etc. In some examples, ML models of the vehicle controller may be configured to perform various operations such as, for example, localizing the autonomous vehicle, detecting objects, classifying objects, tracking objects, generating trajectories, selecting one or more trajectories for controlling the autonomous vehicle, determining whether to communicate data with a teleoperations device, etc.

In some examples, testing and/or training may include further training an existing ("target") ML model, which may include, for example, editing the target ML model based on processing additional iterations of data to change weights of connections in a neural network; and/or testing an experimental ML model at an autonomous vehicle (e.g., running the experimental ML model on the autonomous vehicle to verify that the experimental ML model works as intended and/or whether the experimental ML model meets or exceeds performance of prior configurations of ML models). During normative operation of the autonomous vehicle, when the autonomous vehicle is not conducting testing and/or training, the vehicle controller may be configured with normative ML models. During testing and/or training, the autonomous vehicle may instantiate a second vehicle controller and/or a portion of the first vehicle controller that additionally includes an experimental ML model or replaces a normative ML model with the experimental ML model. Additionally, or alternatively, if the vehicle controller is training a target ML model, the autonomous vehicle may instantiate a second vehicle controller and/or a portion of the first vehicle controller that includes the target ML model.

In some examples, this may include running at least part of a second controller, with the experimental ML model and/or target model, on a virtual machine, container, and/or running at least part of the second controller across a single system image that comprises processing and/or memory components of multiple devices (e.g., multiple autonomous vehicles, an autonomous vehicle and a remote computing device).

In examples employing a virtual machine or container, the autonomous vehicle may record a machine state (e.g., a hypervisor state, an operating system state, a container manager state, a runtime system state, and/or an application state) so that the machine state may be saved for continuance of the testing and/or training at a later point in time if the testing and/or training is interrupted and/or migrated to a second autonomous vehicle and/or remote computing device. In some examples, the autonomous vehicle may simultaneously conduct testing and/or training during "in-service" operation by running at least part of the vehicle controller (e.g., an experimental ML model, a target ML model that is being trained) on a virtual machine or in a separate container (i.e., using a separate runtime system from the runtime system of the first controller) while the vehicle controller is run on a native operating system, a second virtual machine, or a different container.

In some examples, multiple autonomous vehicles may be involved in running one testing and/or training. The autonomous vehicles may create an ad hoc network connection between the multiple vehicles to coordinate maneuvers, positioning, and/or sensor data recording among the vehicles; and/or to split data processing amongst processing devices of the multiple vehicles (e.g., via a single system image).

In some examples, one autonomous vehicle and/or a remote computing device may instantiate a distributed computing architecture such as, for example, a single system image, over multiple autonomous vehicles to share available resources among the vehicles such as, for example, sensor data, processing availability, storage availability. In some examples, data-to-be-processed may be distributed to processors of different vehicles according to the distributed computing architecture. In some examples, the distributed computing architecture may be used to test and/or train ML models, including analyzing performance of one or more vehicles that are operating using an ML model. For example, a first vehicle may operate using an experimental ML model while a second vehicle monitors the first vehicle. In such examples, the second vehicle may monitor sensor data captured by the first vehicle and/or the second vehicle to analyze performance of the first vehicle. As non-limiting examples, such analysis may include, for example, how well the first vehicle adheres to driving rules of the road, an amount of energy consumed to traverse a road segment, an accuracy of object segmentation and/or classification, etc. In those examples where the second vehicle monitors the first, processing power of the first vehicle may be devoted to operating using the experiment ML model, so as not to impact processing performance of the first vehicle. This is discussed further herein as "determining performance metrics."

In an additional or alternate example, a remote computing system and/or an autonomous vehicle may detect a "high processing load" condition on a computing system of an autonomous vehicle and may transmit an indication of the "high processing load" condition to one or more other autonomous vehicles. The high processing load condition may be a condition that causes the autonomous vehicle performance to degrade because the required time to process data caused by the condition meets a threshold. For example, the condition might be an anomalous environment (e.g., enormous number of erratic objects) and/or running testing and/or training, either of which requiring processing a large amount of data. In that case, a remote computing device and/or an autonomous vehicle may transmit an indication to one or more other autonomous vehicles to instantiate a mobile distributed computing resource comprising the one or more other autonomous vehicles, connected via an ad hoc network and configured as a single system image. As such, the performance of the vehicle having a "high processing load" condition may be improved by accessing processing bandwidth of the other autonomous vehicles (e.g., running a process and/or thread at another vehicle's processor and receiving the results of the execution of the process and/or thread from the other vehicle). For example, the vehicle may operate using a trajectory, object classification, predicted object path, etc. determined by one or more other vehicles. In an additional or alternate example, the vehicle may conduct testing and/or training in concert with one or more other vehicles.

In some examples, an autonomous vehicle and/or a remote computing device may analyze performance of the autonomous vehicle as it operated using a trained target model and/or an experimental ML model to determine whether performance of the autonomous vehicle was satisfactory or improved. Historic drive data of the autonomous vehicle and/or other autonomous vehicles may be used as a control to which to compare and/or the test mission may include operating the autonomous vehicle using a normative ML model to establish a control and, separately, using a trained target ML model (i.e., a normative model that has been modified by additional iterations of training) and/or experimental ML model. Metrics for experimentally making such a determination may include a temporal logic output based on the vehicle controller output (i.e., how the autonomous vehicle was driven, including, but not limited to, maximum longitudinal and lateral accelerations, evaluated collisions with obstacles, compliance with rules of the road, etc.), confidence levels, an amount of energy required for performing driving maneuvers, a number of teleoperations interventions, processor load of an ML model, speed of achieving a result by an ML model, etc.

In some examples, if analysis of a trained target ML model and/or experimental ML model meets a threshold value (e.g., a threshold temporal logic score, an average confidence level, a number of teleoperation interventions, etc.), the model may be transmitted as a "validated ML model" to one or more autonomous vehicles of a fleet. In some examples, if an autonomous vehicle is able to validate an ML model, the autonomous vehicle may replace a normative ML model with the trained target ML model and/or experimental ML model. In some examples, the autonomous vehicle may transmit the validated ML to a remote computing device. Additionally, or alternatively, the autonomous vehicle may transmit any partial or complete testing and/or training data to another autonomous vehicle and/or a remote computing device such as, for example, sensor data, machine state (e.g., virtual machine state, container state), analysis data, an unvalidated ML model, a partially-trained ML model, etc.

In some examples, where the test mission corresponding to a now-validated ML model includes a location and/or condition, a remote computing device may transmit the validated ML model to an autonomous vehicle when it is determined that the autonomous vehicle is likely to encounter the location and/or condition. Therefore, in some examples, an autonomous vehicle operating at one location and/or under one condition may be configured with an ML model that has a different structure (e.g., different node connections, different type of ML model, differently trained ML model) than an ML model having the same functionality (e.g., also an object classification ML model) of the same or a different autonomous vehicle operating at a different location and/or under a different condition.

In some examples, an autonomous vehicle may be configured to switch between a first ML model associated with a first location and/or first condition and a second ML model associated with a second location and/or a second condition based on detecting that the autonomous vehicle is likely to encounter the second location and/or the second condition. In such examples, the autonomous vehicle may have an optimized ML model per location, condition, etc. For example, a specialized ML model may be associated with a geophysical location and/or a condition (e.g., time, weather condition, vehicle pose, sensor availability). As a non-limiting example, a first ML model may outperform a second ML model in a city environment. In such an example, the autonomous vehicle may use the first ML model when driving in a city and the second ML model elsewhere. More generally, an autonomous vehicle and/or a remote computing device may determine that the vehicle is or is likely to be at a location (e.g., a route of the autonomous vehicle passes through or near the location) and/or meet a condition (e.g., a forecast calls for rain at the vehicle's location in 15 minutes, the time of day matches the condition associated with the specialized ML model). The remote computing device may transmit the specialized ML model associated with the location and/or condition to the vehicle based on this determination. In additional or alternate examples, the vehicle may request the specialized ML model or, if the specialized ML model is already stored at the vehicle, the vehicle may add the specialized ML model to a pipeline and/or swap the specialized ML model for a corresponding normative ML model that is not associated with the location and/or condition (e.g., a normative ML model accomplishes the same or similar function as the specialized ML model but the normative ML model not weighted and/or structured in a same manner as the specialized ML model).

FIG. 1 illustrates a pictorial flow diagram of an example process 100 for conducting testing and/or training of an ML model at an autonomous vehicle. At operation 102, the example process 100 may include determining to conduct testing and/or training at a first vehicle 104(1). In some examples, the vehicles 104(1)-104(3) may include an autonomous vehicle such as, for example, an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some examples, determining to conduct testing and/or training at the first vehicle 104(1) may be based at least in part on a determination that the first vehicle 104(1) is idle, that the first vehicle 104(1) has unused processing capabilities, and/or that a system load 102(A) does not necessitate the vehicle's operation to meet system performance constraints.

For example, the first vehicle 104(1) and/or a remote computing device 106 (e.g., a teleoperations device, a fleet management device, another vehicle) may determine that a position of the first vehicle 104(1) has not changed for a set amount of time, has not received a task request in a set amount of time, and/or has an idle processing unit and/or is, on average, only using less than a threshold percentage of processing capacity. Additionally or alternatively, the first vehicle 104(1) may be selected to conduct testing and/or training based at least in part on a current or anticipated location and/or a current or anticipated condition at the first vehicle 104(1) that matched a location and/or condition associated with a target ML model and/or an experimental ML model. For example, a particular location and/or condition may cause a target ML model's output to be unreliable. A remote computing device 106 may, in that case, associate that location and/or condition with the target ML model and, once a vehicle of a fleet encounters or is about to encounter the location and/or condition, the remote computing device 106 may transmit instructions to train the target model and/or test an experimental model at the location/during the condition.

In an additional or alternate example, the first vehicle 104(1) and/or a remote computing device 106 may determine that a current and/or predicted demand for the vehicle is unlikely to meet a threshold 108. The measured and/or predicted demand and corresponding threshold may include a number of task requests per time period (e.g., ride requests per hour, task requests per half-hour), a ratio of vehicles to received requests, an average time before a vehicle appears at a requested location (e.g., average of 10 minutes from the time a ride request is submitted before an autonomous vehicle appears at a ride request location), etc. and may be measured across a fleet of vehicles, for vehicles of a specified region, and/or for an individual vehicle. For example, system load 102(A) may depict a predicted or historical number of ride requests per hour over a 24-hour period. Note that "demand" and "service performance" are used interchangeably herein to refer to data related to demand for vehicles (e.g., number of requests per hour) and/or performance of a fleet of vehicles in response to the demand (e.g., average vehicle arrival time, ratio of vehicles "in-service" to number of requests and/or traffic flow density).

This determination may additionally or alternatively include determining an estimated time period for which the vehicle is available to conduct the testing and/or training and/or a number of vehicles that are available for conducting testing and/or training without adversely affecting service performance of the fleet (e.g., without causing an estimated arrival time to meet or exceed a threshold, without causing a ratio of "in-service" vehicles to traffic flow density to meet or exceed a threshold).

In the example system load 102(A), the y-axis may represent a number of historical vehicle requests on a same day of the week, adjusted for known events; or it may represent an estimated vehicle arrival time. In either example, the first vehicle 104(1) may be determined to be available from 8 PM until midnight based at least in part on a determination that demand and/or service performance is not predicted to meet the threshold 108 from 8 PM until midnight by having vehicle 104(1) perform additional computations, testing, and/or training. In another example, a remote computing device 106 may determine to transmit instructions to three vehicles to transition from an "in-service" state to an "out-of-service" state from 8 PM to 9 PM based at least in part on a determination that doing so is not predicted to increase average arrival time to a point where it meets a threshold average arrival time. In some examples, one or more autonomous vehicles may conduct testing and/or training during an "in-service" state instead of or in addition to conducting the testing and/or training in an "out-of-service" state.

For example, one or more autonomous vehicles may detect unused (i.e., unallocated, excess) computational resources at the one or more autonomous vehicles and may use unused computational resources to test and/or train. In some examples, an autonomous vehicle may detect that at least one processor of the autonomous vehicle is capable of processing additional threads. For example, the autonomous vehicle may determine that in addition to the threads being processed for nominative operation of the autonomous vehicle, the autonomous vehicle is capable of allocating processing time to additional threads for the testing and/or training without reducing allocation of threads for the nominative operation of the autonomous vehicle (e.g., by unused clock cycles of the processor, by increasing a processor speed when the processor is not yet at a maximum processor speed, by using an idle core of a processor, etc.). These unused computational resources may be available across one or more processors, memories, and/or one or more vehicles. Moreover, allocation and/or processing of the threads may be conducted over one or more processors and/or one or more vehicles. This means that, in some examples, the techniques include detecting that at least one processor of multiple autonomous vehicles can handle additional threads and assigning allocation and processing of particular threads to different processors of different autonomous vehicles. In some examples, an autonomous vehicle may also predict that processing power of a processor of the vehicle is likely to be unused (and may thereby be allocated threads of a testing and/or training application) based at least in part on route information (e.g., an upcoming long straight roadway without intersections and low traffic), historical data (e.g., processing power associated with anticipated maneuvers along a route), etc.

In some examples, the first vehicle 104(1) and/or a remote computing device 106 may determine to conduct testing and/or training (or other computation) at the first vehicle 104(1) based at least in part on vehicle confidence levels 102(B) and determining a correlation between a degradation 110 in vehicle performance and a condition and/or location. For example, vehicle confidence levels 102(B) are depicted as a graph of vehicle confidence levels over time. Autonomous vehicles may calculate a confidence level based at least in part on data available to the vehicle controller such as, for example, sensor data, data from a remote computing device (e.g., weather conditions, traffic conditions, safety alerts), and/or data produced or stored by components of the vehicle controller (e.g., object classifications, object tracks, maps of available driving surfaces, potential trajectories, route). In some examples, these confidence levels may be expressed as a percentage (e.g., the autonomous vehicle is 97% confident that a control signal produced by the vehicle controller to control a drive system of the vehicle will result in safe operation of the vehicle).

Element 110 indicates a degradation in a confidence level of the vehicle. In some examples, the first vehicle 104(1) and/or a remote computing device 106 may determine a correlation between the degradation 110 and a condition and/or location, based at least in part on current and/or historical sensor data and/or other data available to the first vehicle 104(1) and/or the remote computing device 106 (e.g., municipality alerts, weather conditions, data from other vehicles, traffic information). In some examples, the first vehicle 104(1) and/or a remote computing device 106 may determine to conduct the testing and/or training based on the correlation. In some examples, the testing and/or training may include conducting the testing and/or training while the condition is present and/or at the location correlated with the degradation. The condition may be any one or more of factors such as orientation of the vehicle, ML model output (e.g., a particular object classification), weather conditions (e.g., sunny, foggy), surrounding area conditions (e.g., high number of erratic objects such as small wildlife, slope of roadway, existence of blockages to view), etc.

In some examples, the vehicle 104(1) may perform additional computations and/or testing and/or training when parked, or otherwise stopped (e.g. while waiting on a ride request, while at a stoplight, or otherwise). In such examples, the vehicle 104(1) may perform these computations and/or testing and/or training until a request for a ride, or any computational demand, is created.

In some examples, upon determining that a vehicle is available to conduct testing and/or training, a remote computing device 106 may transmit instructions for a test mission to the vehicle that include a time and/or time period, a location, a condition, and/or instructions for at least one maneuver of the autonomous vehicle(s) for operation during the testing and/or training. In some examples, the time and/or time period configures the autonomous vehicle(s) to transition from an "in-service" state to an "out-of-service" state at or near a time indicated in the and remain in an "out-of-service" state until reception of further instructions from the remote computing device, measured demand increases to a sufficient degree that the threshold is met, the testing and/or training is completed, the time period expires, and/or the testing and/or training is frustrated (e.g., autonomous vehicle incapacity, experimental module failure). The location may include instructions to begin the testing and/or training at a specified geo-physical location and the condition may include instructions to begin the testing and/or training once a condition is fulfilled (e.g., once service demand reduces to meet a threshold, once traffic reaches a specified density, once the sun is at a specified angle, etc.). In some examples, the condition may be a condition that causes degradation of performance of an autonomous vehicle. For example, a test mission may specify a location, an orientation of the autonomous vehicle, weather condition, and a time corresponding to a particular angle of the sun that causes shimmer from a body of water to interfere with a perception engine of the vehicle controller. The test mission may thereby configure the autonomous vehicle to conduct the testing and/or training at the time, location, weather condition (e.g., sunny), and/or orientation. In some examples, the remote computing device 106 may also provide an instruction for the first vehicle 104(1) to train an existing ML model ("target" ML model) or test an experimental ML model. The remote computing device 106 may also transmit an ML model with the test mission such as an experimental ML model.

At operation 112, the example process 100 may include conducting testing and/or training at a first vehicle 104(1). In some examples, the testing and/or training may include further training a target ML model 114 and/or testing an experimental ML model 116 In some examples, this may include training a network using data from a data store (e.g., accessible via a network, streamed to the vehicle from a remote computing device, stored at the vehicle) and/or adapting the target ML model to newly acquired data (e.g., re-weighting connections of a network). In some examples, the testing and/or training may additionally or alternatively include coordinating (112(B)) multiple vehicles 104(1)-104(3).

When the first vehicle 104(1) is not conducting testing and/or training, the vehicle controller of the first vehicle 104(1) may be configured with a set of normative ML models 118. During testing and/or training, the first vehicle 104(1) may add an experimental model 116 to the normative ML models 118 and/or replace one or more normative ML models 118 with an experimental ML model 116. In some examples, the first vehicle 104(1) may additionally or alternatively instantiate a second vehicle controller that runs the normative ML models 118 and additionally includes an experimental model 116 or replaces a normative ML model 118 with the experimental ML model 116. Additionally or alternatively, if the vehicle controller is training a target ML model 114, the first vehicle 104(1) may instantiate a second vehicle controller that includes the target ML model 114 so that it may be modified without affecting the normative vehicle controller or modify the target ML model within the first vehicle controller.

In some examples, instantiating the second vehicle controller may include running at least part of the second controller on a virtual machine, a separate container, and/or running at least part of the second controller across a single system image that comprises processing and/or memory components of multiple devices (e.g., multiple vehicles, a vehicle and a remote computing device).

In some examples, conducting the testing and/or training may include coordinating (112(B)) operations of multiple vehicles 104(1)-104(3). As discussed in more detail below, a remote computing device 106 may transmit instructions to multiple vehicles 104(1)-104(3) configuring the multiple vehicles 104(1)-104(3) to coordinate their operations for testing and/or training. In some examples, this may include coordinating maneuvers, data processing, sensor data capture, network connections, etc. For example, the multiple vehicles 104(1)-104(3) may share data between the vehicles (e.g., sensor data obtained at a first vehicle is transmitted by that vehicle to one or more other vehicles of the multiple vehicles 104(1)-104(3)), the multiple vehicles 104(1)-104(3) may share processing loads between the vehicles (e.g., a processing task generated at one vehicle may be processed by a processor of a different vehicle), movements of the multiple vehicles 104(1)-104(3) may be responsive to instructions sent by one or more of the multiple vehicles 104(1)-104(3), etc.

In some examples, conducting testing may include analyzing performance of the first vehicle 104(1) (and/or multiple vehicles 104(1)-104(3)) as it conducts the evaluation, relative to normative and/or experimental control performance. For example, analyzing performance may include comparing data associated with controlling the vehicle according to experimental control maneuver(s) using normative ML models and/or historic maneuver(s) using normative ML models to data associated with controlling the vehicle according to the same or similar maneuvers using an experimental ML model. Analyzing the performance may include finding that an experimental ML model improves, maintains, or degrades performance of the maneuvers by the vehicle. As non-limiting examples, performance may include an adherence to rules of the road, an amount of energy consumed to perform one or more maneuvers (i.e. an energy efficiency), a ride comfort, and ability to accurately segment and/or classify objects, etc. In some examples, conducting the testing may include capturing experimental control data by conducting control maneuver(s) specified in a test mission while the first vehicle 104(1) is controlled by the vehicle controller configured with normative ML models 118. In some examples, the experimental control data may include historic drive data of the autonomous vehicle and/or other autonomous vehicles that are controlled using normative ML models 118.

In some examples, the first vehicle 104(1), another (second) vehicle 104(2), and/or a remote computing device 106 may determine whether trained target ML model 114 and/or experimental ML model 116 improves operation of the first vehicle 104(1) based at least in part on temporal logic configured to score characteristics of the operation of the first vehicle 104(1) by the vehicle controller (e.g., penalizing hard accelerations, rewarding conformity to driving laws), confidence levels of the vehicle controller during the testing and/or training, processor load of an ML model, speed of achieving a result by an ML model, a number of teleoperation interventions, an amount of energy consumption, etc, or some weighted combination thereof. These scores, levels, and/or numbers may be compared to corresponding control data and/or historic data for a same or similar operation to determine whether an ML model improved operation of the first vehicle 104(1).

At operation 120, the process 100 may include transmitting testing and/or training results from the first vehicle 104(1) (or one or more vehicles of multiple vehicles assigned to the testing and/or training) (120(A)) to a remote computing device 106 via a first network 122 and/or (120(B)) to a second vehicle 104(2) via a second network 124. In some examples, the testing and/or training results may include a trained target model 114 (i.e., a model that formerly existed at the first vehicle 104(1) but that has had its connections, weights, etc. modified due to training), an experimental model 116, and/or performance analysis data (e.g., data recorded to determine whether the target/experimental ML model improved operation of the vehicle or not). In some examples, the results may include partial data, if, for example, the testing and/or training was paused or interrupted.

In some examples, the first vehicle 104(1) may transmit a trained target ML model and/or experimental ML model to a second vehicle 104(2) for the second vehicle 104(2) to conduct testing and/or training using the model and/or to complete testing and/or training started by the first vehicle 104(1). In such examples, transferring the model may comprise transferring not only the architecture of the model, but also the current parameters of the model (e.g. weights between nodes in a neural network), number of iterations performed, batch sizes, an indication of the data used, etc. In some examples, if performance analysis of a trained target ML model and/or experimental ML model indicates that the model meets a threshold requirement (e.g., improvement in temporal logic score over control data, improvement in confidence levels over control data, lower processor load, quicker to achieve, lower energy consumption, no or fewer teleoperator interventions compared to the same maneuver using control data, location, and/or condition) (i.e., the first vehicle 104(1) "validates" the model) then the first vehicle 104(1) and/or the remote computing device 106 may transmit the model to a second vehicle 104(2). In some examples, the model may be transmitted to an entire fleet of vehicles and/or a portion thereof. The transmission may include an indication that the transmitted model is validated (i.e., previously tested and verified to improve or maintain performance of a vehicle for conducting a maneuver) or that the model is in "beta" and requires further testing by the vehicles to which the model is transmitted. In the latter example, the vehicles to which the "beta" model is transmitted may conduct further training and/or testing on the model and, in some examples, may place the "beta" model in the normative ML pipeline of the vehicle and, in other examples, may not place the "beta" model in the normative ML pipeline. In other examples, this may allow for staged rollouts of updated models, for example to a single "beta" vehicle, then to five vehicles, and so on, until there is enough confidence that the model should be put in the normative ML pipeline.

Figure 2:
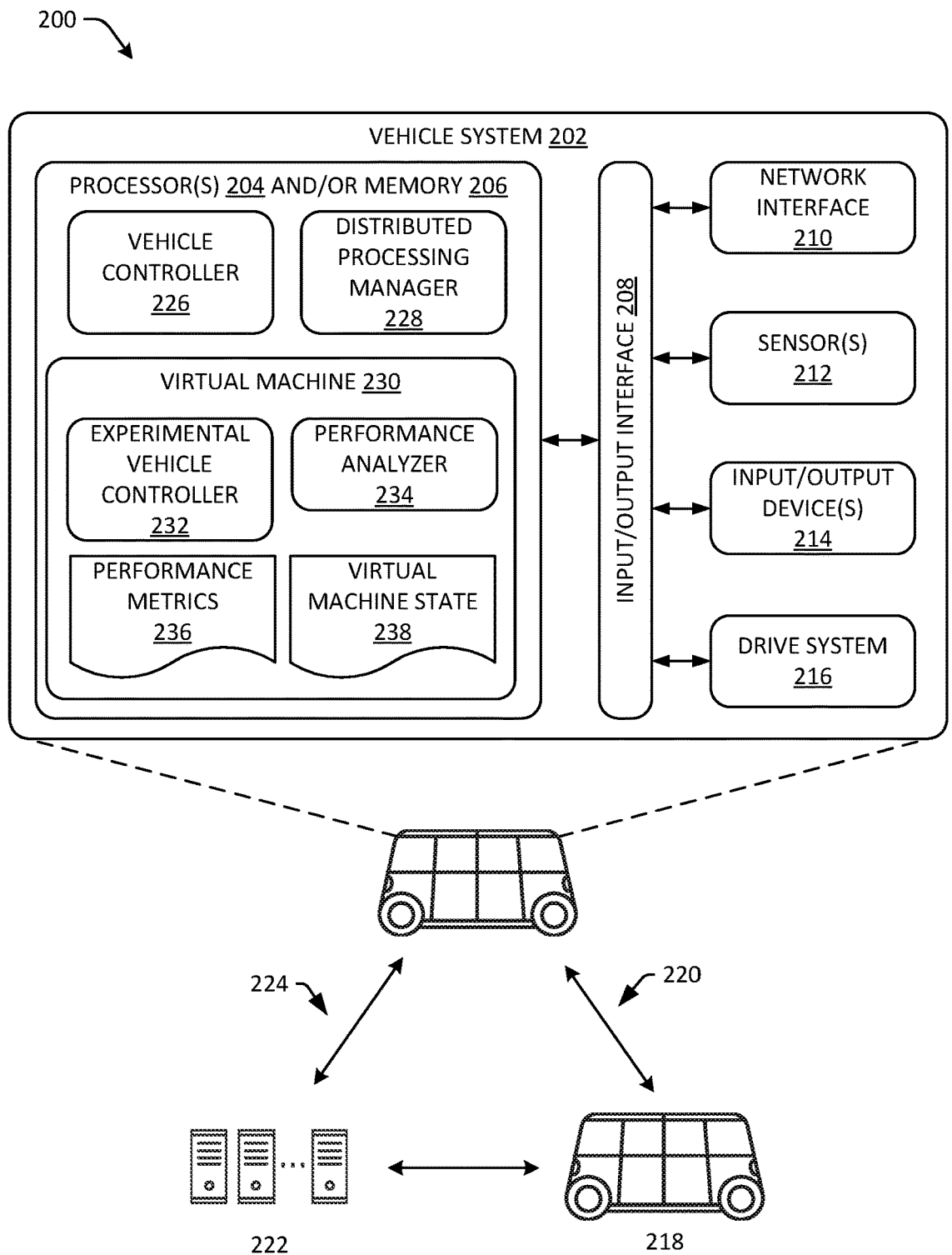
FIG. 2 illustrates a block diagram of an example architecture for controlling operation of a vehicle for training and/or testing ML models.

FIG. 2 is a block diagram of an example architecture 200 including an example vehicle system 202 for controlling operation of at least one vehicle, such as an autonomous vehicle. In some examples, the vehicle system 202 may represent at least a portion of the first vehicle 104(1) and/or any of the multiple vehicles 104(1)-104(3). In some examples, this architecture may be used to control a fleet of vehicles.

In some examples, the vehicle system 202 may include processor(s) 204 and/or memory 206. These elements are illustrated in combination in FIG. 2, although it is understood that they may be separate elements of the vehicle system 202, and that components of the system may be implemented as hardware and/or software, in some examples. For example, a portion of the vehicle controller 226 may be implemented as a hardware processor and another portion may include instructions stored in memory that, when executed by the processor, configure the processor to conduct operations.

Processor(s) 204 may include a uniprocessor system including one processor, or a multiprocessor system including several processors (e.g., two, four, eight, or another suitable number). The processor(s) 204 may be any suitable processor capable of executing instructions. For example, in various implementations, the processor(s) may be general-purpose or embedded processors implementing any of a variety of instruction set architectures (ISAs), such as the ×86, PowerPC, SPARC, or MIPS ISAs, or any other suitable ISA. In multiprocessor systems, each processor 204 may commonly, but not necessarily, implement the same ISA. In some examples, the processor(s) 204 may include a central processing unit (CPU), a graphics processing unit (GPU), or a combination thereof.

The example vehicle system 202 may include memory 206. In some examples, the memory 206 may include a non-transitory computer readable media configured to store executable instructions/modules, data, and/or data items accessible by the processor(s) 204. In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the example vehicle system 202 via an input/output ("I/O") interface 208. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface 210.

Furthermore, though illustrated as a single unit in FIG. 2, it is understood that the processor(s) 204 and memory 206 may be distributed among multiple computing devices of the vehicle.

In some examples, the input/output ("I/O") interface 208 may be configured to coordinate I/O traffic between the processor(s) 204, the memory 206, the network interface 210, sensor(s) 212, I/O devices 214, and/or drive system 216. In some examples, the I/O devices 214 may include external and/or internal speaker(s), display(s), passenger input device(s), etc. In some examples, the I/O interface 208 may perform protocol, timing, or other data transformations to convert data signals from one component (e.g., the non-transitory computer readable media) into a format suitable for use by another component (e.g., processor(s)). In some examples, the I/O interface 208 may include support for devices attached through various types of peripheral buses, such as the Peripheral Component Interconnect (PCI) bus standard, the Universal Serial Bus (USB) standard, or a variant thereof, for example. In some implementations, the function of the I/O interface 208 may be split into two or more separate components, such as a north bridge and a south bridge, for example. Also, in some examples, some or all of the functionality of the I/O interface 208, such as an interface to the memory 206, may be incorporated directly into the processor(s) 204 and/or one or more other components of the vehicle system 202.

The example vehicle system 202 may include a network interface 210 configured to establish a communication link (i.e., "network") between the vehicle system 202 and one or more other devices. For example, the network interface 210 may be configured to allow data to be exchanged between the vehicle system 202 and another vehicle 218 (e.g., vehicle(s) 104(2) and (3), for example) via a first network 220, and/or between the vehicle system 202 and a remote computing system 222 via a second network 224. For example, the network interface 210 may enable wireless communication between another vehicle 218 and/or the remote computing device 222. In various implementations, the network interface 210 may support communication via wireless general data networks, such as a Wi-Fi network, and/or telecommunications networks, such as, for example, cellular communication networks, satellite networks, and the like.

The example vehicle system 202 may include sensor(s) 212, for example, configured to sense movement of the example vehicle system 202 through its environment, sense environmental data (e.g., ambient temperature, pressure, and humidity), and/or sense conditions of an interior of the example vehicle system 202 (e.g., passenger count, interior temperature, noise level). In some examples, the sensor(s) 212 may include a sensor to monitor operations of the vehicle system 202 to perform analysis of performance of the vehicle during normative and/or testing and/or training maneuvers. The sensor(s) 212 may include, for example, one or more lidar sensors, one or more cameras (e.g. RGB-cameras, intensity (grey scale) cameras, infrared cameras, depth cameras, stereo cameras), one or more magnetometers, one or more radar sensors, one or more sonar sensors, one or more microphones for sensing sounds, one or more IMU sensors (e.g., including accelerometers and gyroscopes), one or more GPS sensors, one or more Geiger counter sensors, one or more drive system sensors, and/or other sensors related to the operation of the example vehicle system 202. Other sensors may include, for example, a speed sensor, sensors related to operation of internal combustion engines, batteries, fuel cells, and/or electric motors, sensors related to the tires to detect tire temperature, tire pressure, and/or tread depth, and/or brake-related sensors for detecting brake temperatures and/or wear, and in vehicles having regenerative braking, sensors for detecting parameters related to operation of the regenerative braking system.

The example vehicle system 202 may include a vehicle controller 226 configured to generate control signals for components of the vehicle system 202. For example, the vehicle controller 226 may receive a sensor signal from the sensor(s) 212 and may be configured to generate a control signal for the network interface 210 to establish a communications link and/or transmit a message to a teleoperations system for a teleoperations intervention, a control signal to activate a sensor 212 and/or record sensor data, a control signal for the input/output device(s) 214 to send or receive data from passenger(s) or surroundings of the vehicle system 202, and/or a control signal for the drive system 216 to control movement of the vehicle system 202. To generate a control signal, the vehicle controller 226 may include one or more ML models having different functionalities, as subsequently discussed in more detail. In some examples, the vehicle controller 226 may include hardware and/or software components. In some examples, the vehicle controller 226 may include instructions stored in the memory 206 that, when executed by processor(s) 204, cause the processor(s) 204 and/or the vehicle system 202 to conduct the operations discussed herein.

The example vehicle system 202 may also include a distributed processing manager 228 that is configured to coordinate operations of multiple vehicles. In some examples, the distributed processing manager 228 may include a virtual machine manager (e.g., a hypervisor), a container manger, and/or a single system image manager for abstracting discrete resources across multiple vehicles and load-balancing processing and memory requests across the multiple vehicles. In some examples, the distributed processing manager 228 may relay or assign processing tasks, memory storage, processing results, vehicle maneuvers, vehicle assignments, etc. between multiple vehicles. In some examples, when a vehicle and/or the remote computing system 222 detects a condition that requires an elevated number of resources, the distributed processing manager 228 may coordinate operations of multiple vehicles that are routed to the site requiring the elevated number of resources. Put simply, the vehicles may be organized to provide mobile cloud computing and the distributed processing manager 228 may configure on-the-fly set up and management of distributed computing among multiple vehicles.

The example vehicle system 202 may also include at least one virtual machine 230 (and/or a container), though any number of virtual machines are contemplated. In some examples, conducting testing and/or training at the vehicle system 202 may include running the testing and/or training using an unmodified vehicle controller 226 (e.g., no additional or alternate ML models, which is to say using all normative models), and/or a second instantiation of the vehicle controller run in the virtual machine 230 or a separate container (i.e., using a separate runtime system for the second instantiation from the runtime system of the first controller, managed by a container manger), experimental vehicle controller 232. The experimental vehicle controller 232 may include additional and/or alternate ML models as compared to the normative ML models of the vehicle controller 226. For example, the experimental vehicle controller 232 may include a target ML model that is identical to a corresponding ML model of the vehicle controller 226 before the testing and/or training but that may be modified during the testing and/or training, for example by training; and/or an experimental model (i.e., an ML model that has a different architecture (e.g. a number of layers, connections between nodes, layer types, etc.) than a corresponding existing ML model, which may include the same or different input(s)/output(s)).

In some examples, conducting testing and/or training at the vehicle system 202 may include receiving synthetic data (e.g., images, a series of GPS locations, pose data, a series of velocity and/or acceleration data captured by a sensors other than the sensors of the vehicle and/or created by a simulation of a computing device) and conducting at least part of the testing and/or training using the synthetic data. For example, the vehicle system 202 may use synthetic data, (instead of real-time data gathered at the vehicle) such as previously captured and/or generated lidar point cloud, video, images, etc. and/or may not send an output control signal to components of the vehicle system 202 so that the vehicle generates an output control signal, but does not actually actuate the associated components.

The virtual machine 230 (or container) and/or the vehicle controller 226 may include a performance analyzer 234 that receives sensor data from sensor(s) 212, output of an ML model of the vehicle controller (e.g., confidence levels of one or more ML models of the vehicle controller 226), and/or output control signals from the vehicle controller 226 to determine performance metrics 236 of the operation of the vehicle system 202. In some examples, the performance analyzer 234 may include temporal logic that scores operation of the drive system. In some examples, the performance analyzer 234 may be configured to compare temporal logic scores, confidence levels, processor load of an ML model, amount of energy consumed, speed of achieving a result by an ML model, and/or a number of teleoperator interventions during operation of the vehicle system 202 using a target and/or experimental ML model to operation of the vehicle system 202 using normative ML models. The performance metrics 236 may include an indication that a target and/or experimental ML degrades or improves performance of the vehicle system 202. Models having performance metrics outperforming current models may be considered as validated models. Validated models may be transmitted to a remote computing system for dissemination to a fleet of vehicles, or a portion thereof.

In some examples, the virtual machine 230 or a hypervisor of the virtual machine (or a container manager) may record a machine state 238 that may include a state of the experimental vehicle controller 232, a state of the performance analyzer 234, and/or a state of the machine, such that testing and/or training being conducted at the vehicle system 202 may be migrated to and/or analyzed at another device. In the case of machine learning models, the machine state 238 may also include network architectures, relative weights of connections, number of processed iterations, etc. (where the model is a neural network). The machine state 238 is a record sufficient to allow a second device (or devices) to resume operations of the virtual machine 230 (or container), experimental vehicle controller 232, and/or performance analyzer 234 from a time at which the state was recorded. For example, the machine state 238 may include copied memory pages, flag states, runtime states, operation system states, and/or application states. In some examples, the vehicle system 202 may transmit this information to another vehicle 218 and/or a remote computing device 222 via the network interface 210. In additional or alternate examples, a machine state of the native operating system may be saved (e.g., checkpointed), including, for example, network architectures, relative weights of connections, number of processed iterations, etc. (where the model is a neural network).

In some examples, the vehicle system 202 may be controlled by output of either the vehicle controller 226 or the experimental vehicle controller 232. Both may be run simultaneously, although in some examples, the vehicle system 202 may run one at a time. If the performance metrics 236 indicate that a target and/or experimental ML model degrades performance of the vehicle system 202, the vehicle system 202 may terminate controlling the vehicle system 202 by the vehicle controller that is configured with the target and/or experimental ML model, complete the testing and/or training using synthetic data and/or by producing a synthetic output (i.e., generating a control signal but not sending the control signal to corresponding component(s)), and/or complete the testing and/or training at a remote computing device. In examples using a virtual machine or container, the vehicle system 202 may revert to controlling the vehicle system 202 using the vehicle controller 226 instead of the experimental vehicle controller 232. If the performance metrics 236 indicate that a target and/or experimental ML model improves performance of the vehicle system 202, the vehicle system 202 may replace and/or add the target and/or experimental ML model to the vehicle controller 226 as a normative ML model. This may be done with confirmation from a remote computing device 222 received via the network interface 210, in some examples.

In some examples, the remote computing device 222 may include distributed cloud computing devices and/or a teleoperations device. The remote computing device 222 may provide fleet control for multiple vehicles. In some examples, the remote computing device 222 may determine that one or more vehicles are available to conduct testing and/or training and, based on that determination, may transmit instructions (i.e., a "test mission") to the one or more vehicles to configure them to conduct the testing and/or training, which may include an experimental ML model. Additionally, or alternatively, the vehicle system 202 may send an indication to the remote computing device 222 that it has available processing bandwidth to perform computations and/or testing and/or training. In some examples, the remote computing device 222 may receive a trained target ML model from the one or more vehicles, performance metrics 236, a machine state 238, and/or recorded sensor data. The remote computing device 222 may use this data to determine whether performance of the vehicle system 202 was improved or degraded by inclusion of the target and/or experimental ML model. If the remote computing device 222 determines that a model improved performance of the vehicle system 202 (i.e., the remote computing device 222 "validates" the model), the remote computing device 222 may transmit the validated model to one or more vehicles of a fleet of vehicles. In some examples, the remote computing device 222 may transmit instructions to exchange one or more existing ML models of the one or more vehicles with the validated model. Additionally, or alternatively, the remote computing device 222 may instruct the one or more vehicles to use the validated model in addition to or instead of an existing ML model when a vehicle is in a particular location or experiencing a particular condition. In some examples, the remote computing device 222 may transmit the validated model to a vehicle if the remote computing device 222 and/or the vehicle detects that the vehicle is about to encounter a location and/or condition associated with the validated model.

Figure 3:
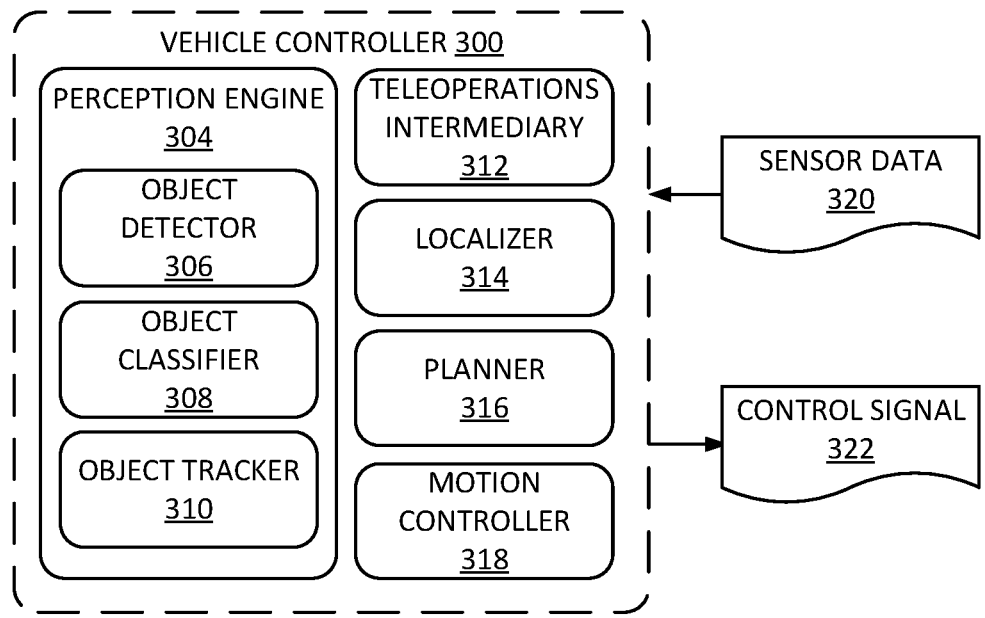
FIG. 3 illustrates a block diagram of an example vehicle controller and an example experimental vehicle controller.
Figure 3:
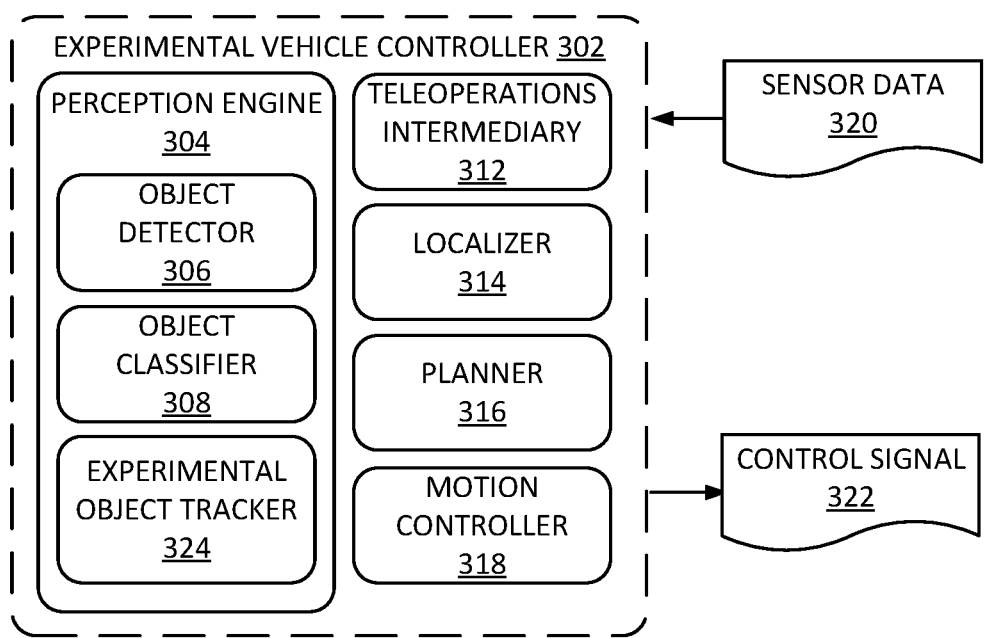

FIG. 3 includes a block diagram of an example vehicle controller 300 and an example experimental vehicle controller 302. Example vehicle controller 300 may represent vehicle controller 226 and example experimental vehicle controller 302 may represent experimental vehicle controller 232. Example vehicle controller 300 and/or example experimental vehicle controller 302 may include ML models configured to perform various operations such as, for example, localizing the autonomous vehicle, detecting objects, classifying objects, tracking objects, generating trajectories, selecting one or more trajectories for controlling the autonomous vehicle, determining whether to communicate data with a teleoperations device, etc. For example, example vehicle controller 300 and/or example experimental vehicle controller 302 may include a perception engine 304 that includes an object detector 306, object classifier 308, an object tracker 310, etc.; a teleoperations intermediary 312 for determining to transmit a message to a remote computing device to receive assistance at the vehicle; a localizer 314 for determining a pose of the vehicle; a planner 316 for determining a route from a first location to a second location, generating potential trajectories for controlling motion of the vehicle, and selecting one or more trajectories as a current and/or contingent trajectory of the vehicle; a motion controller 318 for generating a drive control signal from a selected trajectory and known environmental/vehicle data (e.g., tire slip likelihood, etc.); etc.

Any of these models may use sensor data 320 received from sensor(s) 212 and/or outputs of other models as input and may generate outputs that are used, ultimately, to generate a control signal 322 for controlling various components of the vehicle system 202 (e.g., network interface 210, sensor(s) 212, input/output device(s) 214, drive system 216).

Vehicle controller 300 includes an illustration of a set of "normative" ML models that may be used to control the vehicle system 202 during normal operation of the vehicle. The experimental vehicle controller 302 may include an ML model that is substituted for a normative ML model, such as the experimental object tracker 324 that is depicted in place of object tracker 310. Experimental object tracker 324 and object tracker 310 may have a same function to receive sensor data 320 and/or outputs of other ML models and to output a track (e.g., historical, current, and/or predicted heading, position, velocity, and/or acceleration) for an object that has been detected by the perception engine. However, the experimental object tracker 324 and object tracker 310 may differ in that they may be ML models of a different type (e.g., one may be a convolutional neural network whereas the other is a directed acyclic graph) and/or, at the very least, the two models may have a different architecture (e.g. a number of layers, connections between nodes, layer types, etc.). For example, even if they are of the same type, nodes and connections between the nodes may differ.

Figure 4A:
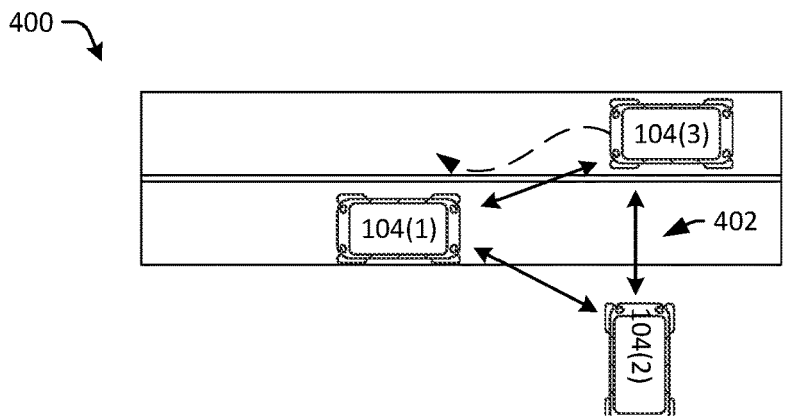
FIG. 4A illustrates an example testing and/or training scenario involving multiple vehicles.

FIG. 4A depicts an example testing and/or training scenario 400 involving multiple vehicles 104(1)-104(3). In some examples, a remote computing device (or a computing device onboard one of the vehicles 104(1)-(3)) may determine that diverting one or more vehicles will be unlikely to cause fleet performance indicators to meet a threshold (i.e., the fleet performance would be unlikely to degrade by the one or more vehicles not being "in-service" during the testing and/or training). In some examples, a remote computing device may transmit a test mission to multiple vehicles 104(1)-104(3) that includes a location, a condition, and/or instructions for at least one maneuver and/or mode for one or more of the vehicles. For a test mission that includes multiple autonomous vehicles, each vehicle may operate according to a same or different mode. The vehicles may be connected via an ad hoc network 402 and may coordinate assignment of modes via the ad hoc network 402 and distributed processing managers stored at the respective vehicles.

In some examples, a first vehicle 104(1) may operate according to a subject mode as a "subject vehicle" where the first vehicle 104(1) has a target ML model and/or experimental ML model stored thereon and trains and/or tests the target and/or experimental ML model. A second vehicle 104(2) may operate according to an observation mode where the second vehicle 104(2) captures sensor data that is used to develop a target and/or experimental ML model and/or to evaluate operation of the subject vehicle (e.g., this may include positioning the vehicle where it can record the subject vehicle from a "third-party" perspective). A third vehicle 104(3) may operate according to a scenario mode where the autonomous vehicle operates to set up a scenario for the benefit of the subject vehicle (e.g., driving erratically, flickering headlights/taillights, blocking a portion of the roadway, etc. to assist in training and/or testing operation of the subject vehicle using the target and/or experimental ML model). Example scenario 400 depicts the third vehicle 104(3) performing an erratic driving or swerving maneuver for the benefit of training or testing an ML model at the first vehicle 104(1). The second vehicle 104(2) operates in an observation mode in example scenario 400 to provide additional sensor data and/or processing and/or storage capacity for testing and/or training the ML model at the first vehicle 104(1). In some examples, the second vehicle 104(2) and/or the third vehicle 104(3) may also operate in a subject mode to test and/or train a same or different ML model at the respective vehicles.

Figure 4B:
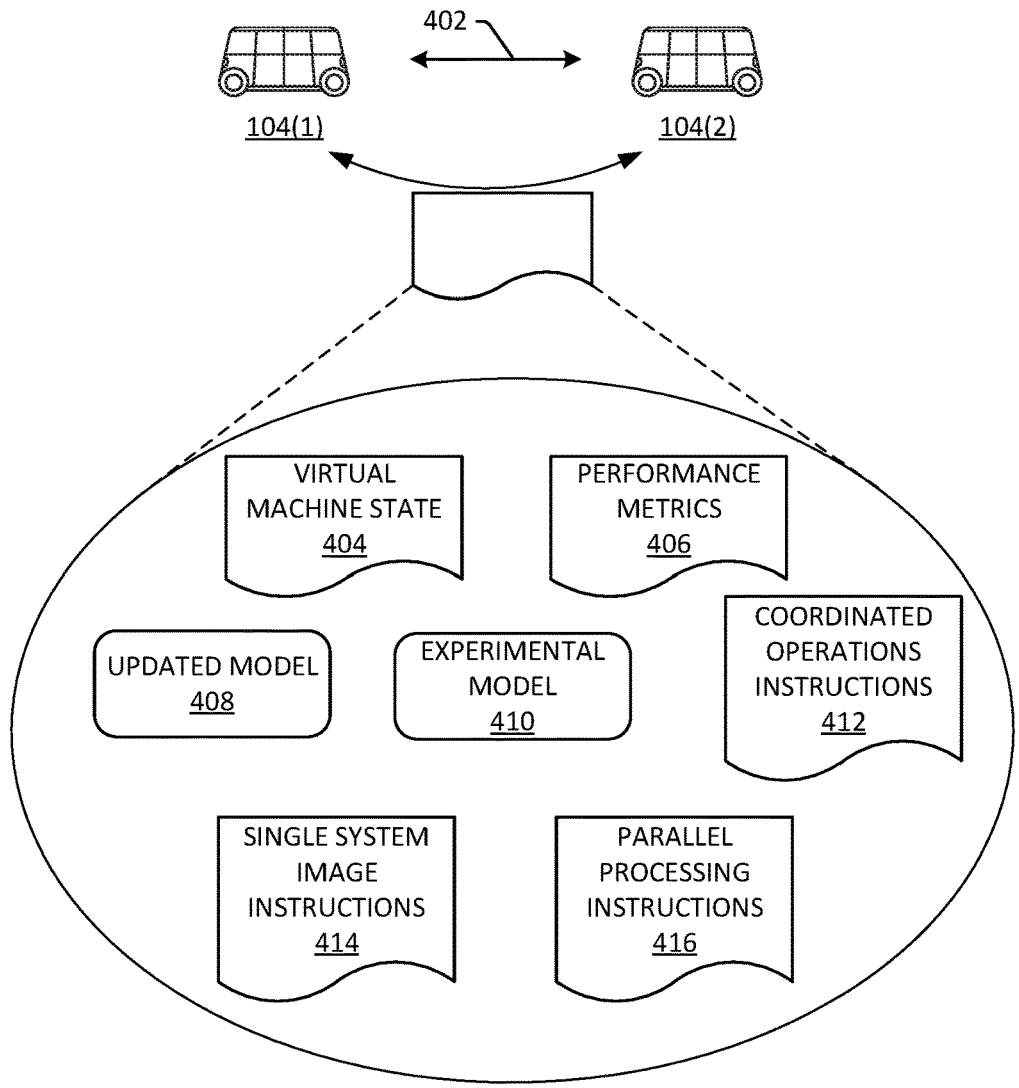
FIG. 4B illustrates an example evaluation coordination between two vehicles for testing and/or training an ML model.

FIG. 4B depicts an example coordination between two vehicles, 104(1) and 104(2) to train and/or test an ML model, according to a variety of examples. In some examples, the first vehicle 104(1) may migrate testing and/or training to second vehicle 104(2) by transmitting a machine state 404 (including network architectures, current weights of connections, numbers of iterations, training data, etc.), any performance metrics 406 that may have been determined by the first vehicle 104(1), an updated model 408 (which may include a trained target ML model) and/or an experimental model 410 to the second vehicle 104(2). This data may be incomplete.

In some examples, distributed processing managers of the respective vehicles may transmit coordination instructions 412 between each other to coordinate sensor data capture, assigning testing and/or training modes (e.g., subject, observer, scenario), distributing processing and/or memory loads among the vehicles, etc.

In some examples, the vehicles, 104(1) and 104(2), may act as mobile cloud computing devices that lend mobile sensing, processing, memory, and/or I/O to another vehicle and/or according to a test mission from a remote computing device. For example, the remote computing device may instruct one or more vehicles to provide mobile cloud computing service at or near a location so that a network is not burdened by transmitting data to the remote computing device, additional sensors and/or memories are available, and/or processing capacity is increased for monumental processing tasks (e.g., on-the-fly deep learning, convolutional signal filtration). In some examples, mobile cloud computing may additionally include edge computing, which may include conducting computations, storage, network functions, etc. at an edge device such as, for example, Internet-of-Things (IoT) devices, integrated access devices (IADs), multiplexers, metropolitan area network (MAN) devices, wide area network (WAN) devices, a computing device of a vehicle, and/or other devices that provide an entry point to an enterprise or service provider.

To provide mobile cloud computing capabilities and/or to lend computing resources (e.g., sensor(s), processor(s), memory, I/O capabilities) to testing and/or training, vehicles 104(1) and 104(2) may form a single system image across the resources of the vehicles 104(1) and 104(2), managed by a one or more distributed processing managers of the vehicles 104(1) and 104(2). The vehicles 104(1) and 104(2) may therefore relay single system image instructions 414 between the vehicles according to this example. In an additional or alternative example to using a single system image, a distributed processing manager of one of the vehicles may load balance processing requests and transmit parallel processing instructions 416 to the other vehicle to coordinate parallel processing data between the two vehicles.

Figure 5:
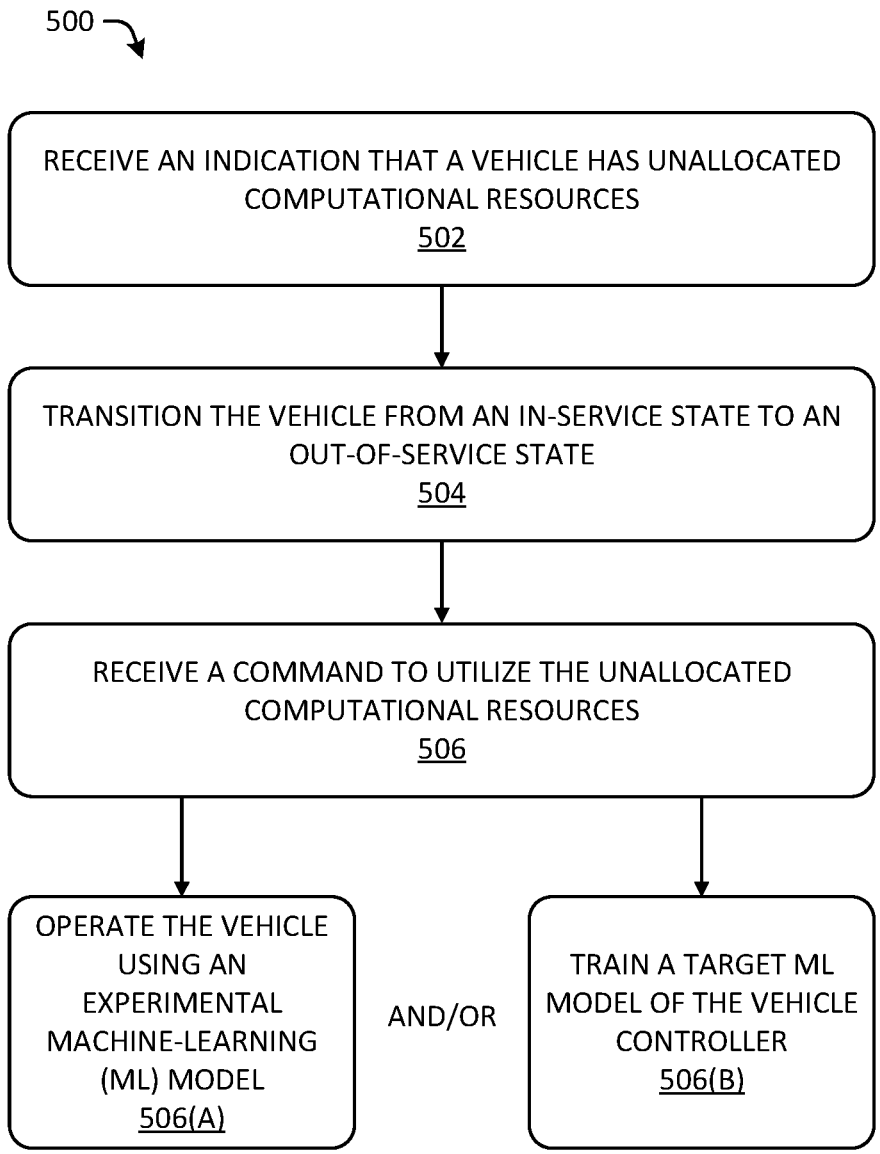
FIG. 5 illustrates a flow diagram of an example process for controlling a vehicle to conduct training and/or testing.

FIG. 5 illustrates a flow diagram of an example process 500 for controlling a vehicle to divert from an in-service state to conduct testing and/or training.

At operation 502, the example process 500 may include receiving an indication that a vehicle has unallocated computational resources, according to any of the techniques discussed herein. In some examples, the vehicle may receive the indication via a network interface from a remote computing device and/or the vehicle may receive the indication from a determination conducted by a processor of the vehicle. In some examples, a computing system onboard the vehicle may make a determination that the vehicle is capable of performing additional computations and or testing and/or training. In some examples, a test mission may accompany the indication. In some examples, this may include making a determination that transitioning the vehicle from an in-service state to an out-of-service state will not impact fleetwide service such that a threshold of fleetwide service is met.

At operation 504, the example process 500 may optionally include transitioning the vehicle from an in-service state to an out-of-service state, based at least in part on determining that the vehicle has unallocated computational resources, according to any of the techniques discussed herein. In some examples, the vehicle may transition from an in-service state to an out-of-service state at a time or upon meeting a condition specified by a test mission. In some examples, a vehicle in an in-service state responds to requests to complete tasks (e.g., requests for a ride, requests to complete an excavation) whereas in an out-of-service state the vehicle does not respond to these requests. In some examples, the vehicle may transition back to an in-service state from an out-of-service state if a current fleet performance metric indicates that a threshold is met or is likely to be met (e.g., estimated average arrival time of a vehicle is likely to increase to at least meet a threshold average arrival time in the next half hour), if the testing and/or training is otherwise frustrated (e.g., performance metrics indicate that an ML model performs poorly enough to terminate the testing and/or training, impossibility of completion), a time period for completing the testing and/or training expires, etc. In some examples, operation 504 may be bypassed. In such examples, additional computation and/or testing and/or training may be performed while the vehicle remains "in-service" by using spare processor cycles (e.g., processor cycles that are not allocated to a thread).

At operation 506, the example process 500 may include receiving a command to utilize the unallocated computational resources. This may be done while the vehicle is in the in-service state, in some examples, or in the out-of-service state, in other examples. In some examples, the command may include a command to conduct testing and/or training or performing the additional computation at the vehicle. The training and/or testing may be accomplished by (506(A)) operating the vehicle using an experimental ML model and/or (506(B)) training a target ML model of the vehicle controller to obtain an updated ML model based at least in part on operating the vehicle using the target ML model, according to any of the techniques discussed herein. In some examples, the vehicle may conduct 506(A) and/or 506(B) without transitioning to an out-of-service state.

Figure 6:
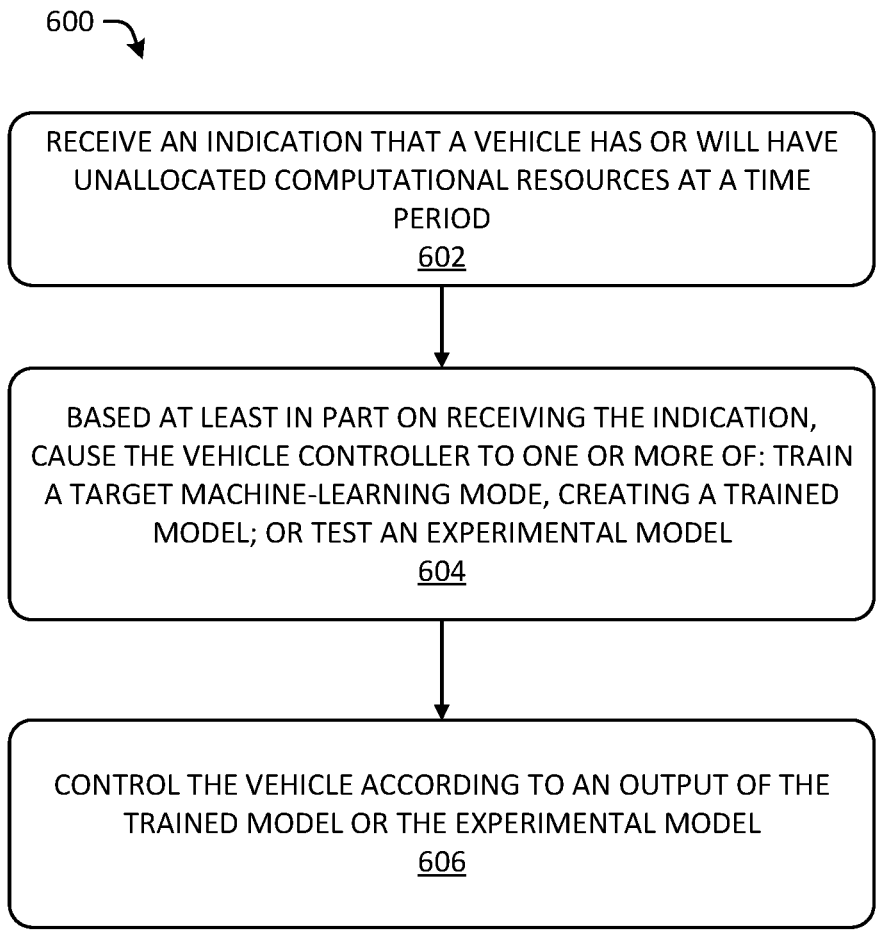
FIG. 6 illustrates a flow diagram of an example process for testing and/or training an ML model at a vehicle.

FIG. 6 illustrates a flow diagram of an example process 600 for conducting testing and/or training to train or test an ML model at a vehicle.

At operation 602, the example process 600 may include receiving an indication that the vehicle has or will have unallocated computational resources at a time period, according to any of the techniques discussed herein. In some examples, the indication is an indication that the vehicle has been selected. The vehicle may be selected to conduct training, testing, and/or additional computations based at least in part on a current or anticipated location of and/or condition at the vehicle. For example, selecting the vehicle based on the anticipated location and/or condition may allow the vehicle to test an ML model for an edge case (e.g., a situation that does not frequently arise) known to occur in that location and/or condition. In some examples, the indication may be accompanied by a test mission that includes instructions for conducting testing and/or training. For example, the test mission may include a time, location (e.g., a safe location for testing and/or training an ML model), condition, maneuver, and/or manner of establishing an experimental control (e.g., identifying and/or transmitting a set of data to use as the experimental control and/or instructing the vehicle to perform experimental control maneuvers).

At operation 604, the example process 600 may include causing the vehicle controller to train a target ML model of the vehicle, creating a trained model; and/or test an experimental ML model, according to any of the techniques discussed herein.

At operation 606, the example process 600 may include controlling the vehicle according to an output of the trained model and/or test the experimental ML model, based at least in part on receiving the instructions and at the beginning of the time period, according to any of the techniques discussed herein.

Figure 7:
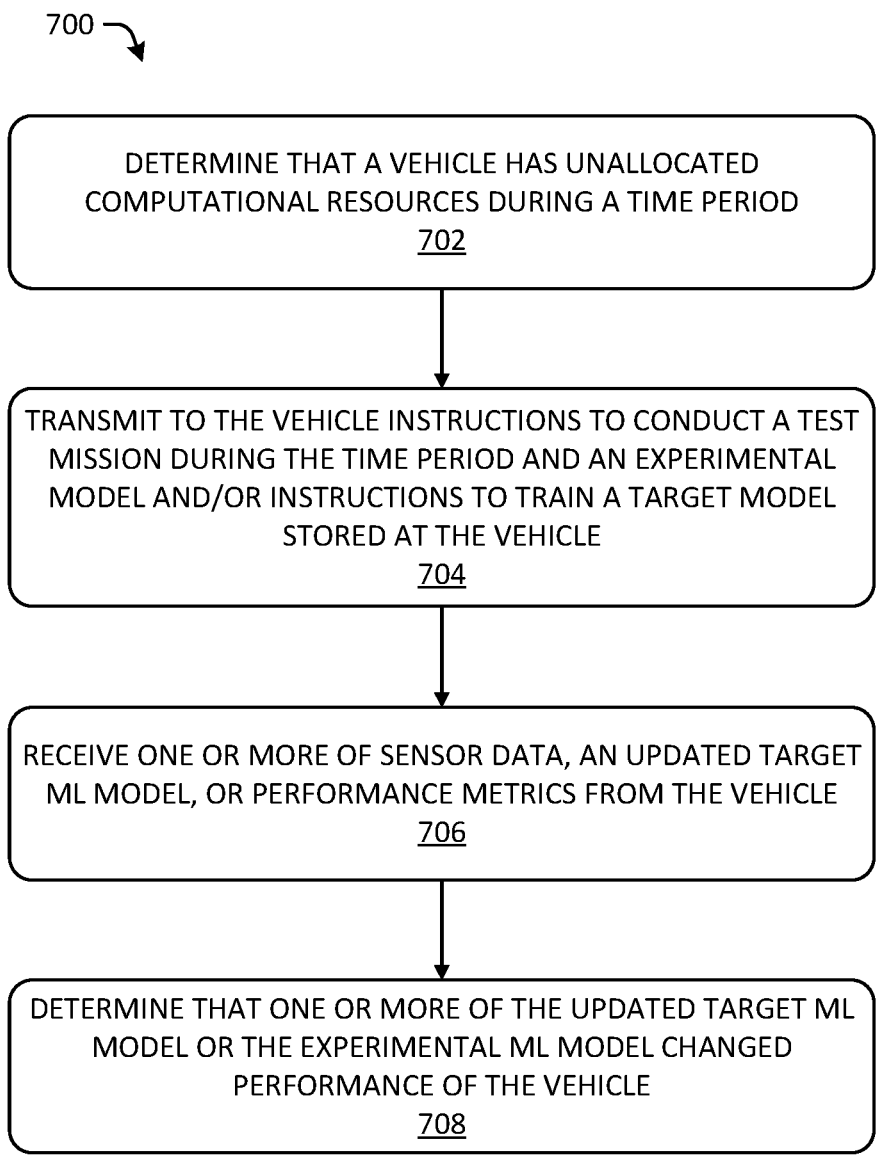
FIG. 7 illustrates a flow diagram of an example process for diverting a vehicle to conduct an evaluation to train and/or test an ML model.

FIG. 7 illustrates a flow diagram of an example process 700 for utilizing spare computational resources of a vehicle to train and/or test an ML model. In some examples, the example process 700 may be conducted on a remote computing device.

At operation 702, the example process 700 may include determining that a vehicle has unallocated computational resources during a time period, according to any of the techniques discussed herein. In some examples, this may include accessing historic fleet data and determining a likelihood that the vehicle will be available during the time period. In some examples, a computing system onboard the vehicle may determine an excess computing ability and provide an indication of the excess computing ability to the remote computing system.

At operation 704, the example process 700 may include transmitting to the vehicle instructions to conduct a test mission during the time period and one or more of an experimental ML model or instructions to train a target ML model stored at the vehicle, according to any of the techniques discussed herein. The remote computing device may additionally or alternatively determine and/or receive a location, condition, maneuver, and/or manner of establishing an experimental control to include in the instructions to conduct a test mission at the vehicle.

At operation 706, the example process 700 may include receiving one or more of sensor data, an updated target ML model, or performance metrics from the vehicle that correspond to completion of at least a portion of the test mission, according to any of the techniques discussed herein.

At operation 708, the example process 700 may include determining that one or more of the updated target ML model or the experimental ML model changed performance of the vehicle (e.g., improved, maintained, or degraded performance of the vehicle), according to any of the techniques discussed herein. In some examples, the example process 700 may further include transmitting the updated target ML model and/or the experimental ML model to one or more vehicles of a fleet if the model improves or maintains performance of the vehicle. This transmission may be accompanied with instructions to replace a normative ML model with the updated target ML model and/or the experimental ML model and/or instructions to add the updated target ML model and/or the experimental ML model to an ML pipeline.

EXAMPLE CLAUSES

A. A vehicle comprising: a vehicle controller operably connected to at least one sensor, a network interface, and a drive system to control operation of the vehicle, the vehicle controller being configured to: receive an indication that the vehicle controller has unallocated computational resources; receive a command to utilize the unallocated computational resources, the command causing the vehicle controller to be further configured to conduct one or more of: testing an experimental machine learning (ML) model based at least in part on causing the drive system to control operation of the vehicle using the experimental ML model, the testing yielding a test result, or training a target ML model to create a trained ML model, based at least in part on causing the drive system to control operation of the vehicle using the target ML model.

B. The vehicle of paragraph A, wherein the indication that the vehicle controller has unallocated computational resources comprises one or more of: an indication that a service demand for the vehicle is unlikely to meet a threshold, based at least in part on present or historical fleet information, an indication that the vehicle is idle, or an indication that a service demand for the vehicle is unlikely to meet a threshold during a time period.

C. The vehicle of paragraph B, wherein the threshold is one or more of a number of requests for rides, an average wait time before arrival of a vehicle, or a ratio of vehicles in-service to requests.

D. The vehicle of either paragraph B or C, the vehicle controller being further configured to terminate conducting the testing or training based at least in part on one or more of: determining that the time period has lapsed, receiving a task for the vehicle to perform, or determining or receiving an indication that the service demand for the vehicle has increased past the threshold.

E. The vehicle of any one of claims A-D, wherein: the vehicle controller is configured to conduct an evaluation, and testing the experimental ML model further comprises: determining instructions for controlling the autonomous vehicle from the vehicle controller based at least in part on an output of the experimental ML model; and determining performance metrics of the experimental ML model based at least in part on control of the vehicle according to the instructions.

F. The vehicle of any one of claims A-E, wherein: the vehicle controller is a first instance of the vehicle controller that comprises a current ML model, and conducting one or more of the testing or the training comprises: instantiating a second vehicle controller in a virtual machine or container, the second vehicle controller comprising one or more of the experimental ML model or the target ML model; receiving first instructions for controlling the vehicle from the first instance of the vehicle controller at a first time; receiving second instructions for controlling the vehicle from the second instance of the vehicle controller at a second time, the second time being substantially the same as the first time; controlling the vehicle according to the first instructions or the second instructions; and determining performance metrics of one or more of the first instance of the vehicle controller or the second vehicle controller based at least in part on one or more of the first instructions, the second instructions, or sensor data.

G. The vehicle of any one of claims A-F, wherein: the vehicle receives a test mission via the network interface, the test mission including a location and a condition; and the vehicle controller is configured to conduct one or more of testing or training, the testing and training configured to consume sensor data associated with the location and the condition.

H. The vehicle of paragraph G, wherein one or more of the location or the condition correlates with a decrease in vehicle performance, and further wherein the sensor data is previously recorded sensor data.

I. The vehicle of any one of claims A-H, wherein conducting one or more of the testing or the training includes: instantiating a virtual machine and/or container on a processor of the vehicle; and evaluating one or more of the experimental ML model or the target ML model on the virtual machine and/or container.

J. The vehicle of paragraph I, the vehicle controller being further configured to: terminate conducting the testing or the training; and migrate, via the network interface of the vehicle, one or more of a machine state, machine state, sensor data, performance metrics, the experimental ML model, or the trained ML model to one or more of a remote computing device or another vehicle, based at least in part on the termination.

L. The vehicle of paragraph K, wherein one or more of the machine state, sensor data, performance metrics, the experimental ML model, or the updated ML model are configured to enable the one or more of the remote computing device or the other vehicle to resume the evaluation from a point at which the evaluation was terminated.

M. The vehicle of any one of claims A-L, the vehicle controller being further configured to: form an ad hoc connection with one or more other vehicles via the network interface; receive a test mission from a remote computing device via the network interface; and transmit instructions to the one or more other vehicles to cause the one or more other vehicles to one or more of conduct a maneuver or change a mode of operation, according to the test mission.

N. The vehicle of any one of claims A-M, the vehicle controller being further configured to: form an ad hoc connection with one or more other vehicles via the network interface; transmit a portion of data to be processed for the evaluation to at least one of the one or more of the vehicles; and receive a processing result determined by the at least one of the one or more of the vehicles.

O. The vehicle of paragraph N, wherein forming the ad hoc connection includes instantiating a single system image across the one or more vehicles or instantiating a virtual machine cluster and/or container cluster among the one or more vehicles.

P: The vehicle of any one of claims A-O, wherein the vehicle controller is further configured to transition the vehicle from an in-service state to an out-of-service state, based at least in part on determining that the vehicle has unallocated computational resources.

Q. A method of controlling a vehicle comprising: receiving an indication that a vehicle controller of the vehicle has or will have unallocated computational resources at a time period; based at least in part on receiving the indication, causing the vehicle controller to: train a target machine-learning model, creating a trained model, or test an experimental model; and control the vehicle according to an output of the trained model or the experimental model.

R. The computer-implemented method of paragraph Q, wherein the method further comprises receiving a test mission, the test mission comprising one or more of a location or condition; and the vehicle controller is further configured to evaluate the experimental model or the trained model based at least in part on the test mission.

S. The computer-implemented method of paragraph R further comprising: instantiating a virtual machine and/or container to determine an output of the trained model or the experimental model; determining that the vehicles is not able to complete the test mission; terminating training the trained model or testing the experimental model according to the test mission; recording one or more of a machine state, a machine state, sensor data, performance metrics, the experimental model, or an updated model derived from training the target model; and at least one of: transmitting one or more of the machine state, sensor data, performance metrics, the experimental model, or the updated model to one or more of a remote computing device or another vehicle; or resuming the test mission using one or more of the machine state, the machine state, the sensor data, the performance metrics, the experimental model, or the updated model, based at least in part on receiving an indication that the excess computing resources are subsequently available.

T. A non-transitory computer-readable medium having a set of instructions that, when executed, cause one or more processors to perform operations comprising: determining that a vehicle has unallocated computational resources during a time period; transmitting to the vehicle instructions to conduct a test mission during the time period and one or more of an experimental model or instructions to train a target model stored at the vehicle; receiving one or more of sensor data, an updated target model, or performance metrics from the vehicle that correspond to completion of at least a portion of the test mission; and determining that one or more of the updated target model or the experimental model changed performance of the vehicle.

U. The non-transitory computer-readable medium of paragraph T, the set of instructions further causing the one or more processors to perform operations comprising transmitting one or more of the trained model or the experimental model to one or more additional vehicles of a fleet, based at least in part on determining that one or more of the trained model or the experimental model improves performance of the vehicle.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously, in reverse order, with additional operations, or omitting operations, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A vehicle comprising:
   one or more processors; and
   memory storing instructions that, when executed by the one or more processors, cause the vehicle to perform operations comprising:
     determining an amount of unused computational resources associated with the vehicle, the amount of unused computational resources comprising at least one of an amount of free memory of the memory or a percentage of unused processing of the one or more processors; and
     processing, as a computational task and based at least in part on the amount of unused computational resources, at least one of:
       testing a machine learned model, or training a machine learning model to create a trained machine learned model.

2. The vehicle of claim 1, wherein the computational task is processed while the vehicle is operated in an in-service state or an out-of-service state.

3. The vehicle of claim 1, wherein the vehicle is one of a fleet of vehicles, and wherein processing the computational task is further based at least in part on a service demand associated with the fleet of vehicles being less than or equal to a threshold demand.

4. The vehicle of claim 1, wherein testing the machine learned model comprises controlling the vehicle based at least in part on an output of the machine learned model and determining a result.

5. The vehicle of claim 4, wherein the operations further comprise transmitting the machine learned model to at least one of an additional vehicle or a server based at least in part on the result.

6. The vehicle of claim 1, wherein determining the amount of unused computational resources is based at least in part on at least one of a current route of the vehicle or availability of at least one fleet vehicle from historical data.

7. The vehicle of claim 1, wherein the computational task is performed until a time period has lapsed, a task for the vehicle to perform is received, or a service demand for the vehicle has increased passed a threshold.

8. The vehicle of claim 7, wherein the threshold is based at least in part on a number of requests for rides, an average wait time, or a ratio of a number of vehicles to a number of requests.

9. A method of controlling a vehicle comprising:
   determining an amount of unallocated computational resources, computational resources comprising one or more memory or processor operations of a computing system of a vehicle; and
   processing, based at least in part on the amount of unallocated resources, a computational task, the computational task comprising at least one of:
     testing a machine learned model, or training a machine learning model to create a trained machine learned model.

10. The method of claim 9, wherein the machine learned model or the trained machine learned model is used to identify an object in an environment surrounding the vehicle, plan a route for the vehicle, plan a trajectory for the vehicle, or interact with an object, passenger, or human.

11. The method of claim 9, wherein the trained machine learned model is used to handle previously unencountered scenarios or to improve one or more driving parameters for the vehicle.

12. The method of claim 9, wherein processing the computational task further comprises:
receiving a test mission comprising a location or condition; and
processing the computational task is based at least in part on the test mission.

13. The method of claim 9, wherein testing the machine learned model comprises controlling the vehicle according to an output of the machine learned model and determining a result.

14. The method of claim 9, wherein the vehicle is one of a fleet of vehicles, and wherein processing the computational task is further based at least in part on an availability of fleet vehicles from historical data.

15. One or more non-transitory computer-readable media having a set of instructions that, when executed, cause one or more processors to perform operations comprising:
determining an amount of unallocated computational resources associated with a computing system of a vehicle; and
based at least in part on the amount of unallocated computational resources, at least one of:
testing a machine learned model, or
training a machine learning model to create a trained machine learned model.

16. The one or more non-transitory computer-readable media of claim 15, wherein testing the machine learned model comprises controlling the vehicle based at least in part on an output of the machine learned model and determining a result.

17. The one or more non-transitory computer-readable media of claim 16, wherein the operations further comprise transmitting, based at least in part on the result, the machine learned model to at least one of an additional vehicle or a server accessible by the additional vehicle.

18. The one or more non-transitory computer-readable media of claim 15, wherein the at least one of testing the machine learned model or training the machine learning model is further based at least in part on a state of the vehicle.

19. The one or more non-transitory computer-readable media of claim 15, wherein the amount of unallocated computational resources comprises at least one of an amount of unused memory or an amount of unused processing operations, and wherein the at least one of testing the machine learned model or training the machine learning model is performed until at least one of a task for the vehicle to perform is received or until a service demand for the vehicle meets or exceeds a threshold.

20. The one or more non-transitory computer-readable media of claim 15, wherein the vehicle is one of a fleet of vehicles, and
wherein the at least one of testing the machine learned model or training the machine learning model is further based at least in part on a utilization of the fleet.

* * * * *